(12) United States Patent
Hermann et al.

(10) Patent No.: US 7,078,474 B2
(45) Date of Patent: Jul. 18, 2006

(54) THERMALLY CURABLE COATING COMPOSITIONS

(75) Inventors: Ulrich Hermann, Graz (AT); Rudolf Schipfer, Graz (AT); Guenther Monschein, Kalsdorf (AT)

(73) Assignee: E. I. duPont de Nemours and Company, Wilmington, DE (US)

( * ) Notice: Subject to any disclaimer, the term of this patent is extended or adjusted under 35 U.S.C. 154(b) by 39 days.

(21) Appl. No.: 10/886,365

(22) Filed: Jul. 7, 2004

(65) Prior Publication Data

US 2006/0009606 A1 Jan. 12, 2006

(51) Int. Cl.
*C08G 18/80* (2006.01)
(52) U.S. Cl. .......................... 528/45; 528/72; 524/901; 427/388.4; 428/425.8
(58) Field of Classification Search ................ 528/45, 528/72; 524/901; 427/388.4; 428/425.8
See application file for complete search history.

(56) References Cited

U.S. PATENT DOCUMENTS

| | | | |
|---|---|---|---|
| 3,257,480 A | | 6/1966 | Hechenbleikner et al. |
| 3,458,605 A | * | 7/1969 | Tilley et al. ................ 558/159 |
| 3,511,857 A | | 5/1970 | Barnauckas et al. |
| 4,296,010 A | * | 10/1981 | Tominaga ................... 524/591 |
| 5,093,416 A | | 3/1992 | Blout et al. |

OTHER PUBLICATIONS

BASF Handbook on Basics of Coating Technology, pp. 96-97, 2003.
Copending Application No. 10/988,967, filed Nov. 15, 2004.
The International Search Report and Written Opinion of the International Searching Authority, Application No. PCT/US2005/023976, Mailed: Nov. 21, 2005.

* cited by examiner

*Primary Examiner*—Rachel Gorr

(57) ABSTRACT

Thermally curable coating composition with a resin solids content which contains (a) at least one binder with isocyanate-reactive groups and at least one polyisocyanate crosslinking agent blocked by means of at least one dihydrocarbyl phosphite and/or (b) at least one self-crosslinkable binder with isocyanate-reactive groups and with isocyanate groups blocked by means of at least one dihydrocarbyl phosphite.

8 Claims, No Drawings

THERMALLY CURABLE COATING COMPOSITIONS

FIELD OF THE INVENTION

The present invention relates to coating compositions thermally curable by reaction of isocyanate-reactive groups (functional groups reactive with isocyanate and comprising active hydrogen) with isocyanate groups blocked by means of dihydrocarbyl phosphite.

DESCRIPTION OF THE PRIOR ART

Coating compositions which contain blocked polyisocyanate crosslinking agents constitute prior art. Alcohols, glycol ethers, amines, lactams, phenols, oximes, CH-acidic compounds and azoles are examples of blocking agents which have been used (c.f. A. Goldschmidt and H.-J. Streitberger, BASF Handbook on Basics of Coating Technology, Vincentz, Hannover 2003, pages 96 to 97).

SUMMARY OF THE INVENTION

Novel thermally curable (crosslinkable) coating compositions have now been developed which extend the available range of coating compositions curable by means of blocked isocyanate. One particular advantage is the good corrosion protection achievable with coating layers applied from said coating compositions onto metal substrates.

The invention therefore provides thermally curable coating compositions with a resin solids content which contains (a) at least one binder with isocyanate-reactive groups and at least one polyisocyanate crosslinking agent blocked by means of at least one dihydrocarbyl phosphite and/or (b) at least one self-crosslinkable binder with isocyanate-reactive groups and with isocyanate groups blocked by means of at least one dihydrocarbyl phosphite.

DETAILED DESCRIPTION OF THE EMBODIMENTS

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within the ranges. Also, the disclosure of these ranges is intended as a continuous range including every value between the minimum and maximum values.

All patents, patent applications and publications referred to herein are incorporated by reference in their entirety.

The coating compositions are liquid coating compositions containing water and/or organic solvent or water- and organic solvent-free coating compositions, for example, 100% solids liquid coatings or powder coatings. The resin solids content of the coating compositions comprises (a) at least one binder with isocyanate-reactive groups and at least one polyisocyanate crosslinking agent blocked by means of at least one dihydrocarbyl phosphite and/or (b) at least one self-crosslinkable binder with isocyanate-reactive groups and with isocyanate groups blocked by means of at least one dihydrocarbyl phosphite. Examples of isocyanate-reactive groups of the binders are hydroxyl groups and/or primary amino groups and/or secondary amino groups.

The coating compositions are preferably thermally externally crosslinking systems based on at least one binder with isocyanate-reactive groups and at least one polyisocyanate blocked by means of at least one dihydrocarbyl phosphite, as a separate crosslinking agent.

The binders comprising isocyanate-reactive groups may be any desired binders known per se to the person skilled in the art, for example, polyester, polyurethane, polyurea, (meth)acrylic copolymer or epoxy resins, maleate oils, polybutadiene oils and binders derived from such resins, for example, also hybrid binders, in which at least two representatives of these binder classes are present and are joined together covalently and/or in the form of interpenetrating resin molecules.

In the case of aqueous coating compositions, the binders, if not dispersed by means of external emulsifiers, contain conventional groups providing water dilutability or water solubility, for example, ionic groups or groups which may be converted into ionic groups and/or hydrophilic polyether groups.

As already stated, the coating compositions are preferably coating compositions that crosslink externally with polyisocyanate blocked by means of dihydrocarbyl phosphite.

Examples of dihydrocarbyl phosphite-blockable polyisocyanates are diisocyanates, such as, aliphatic, cycloaliphatic, aromatic or araliphatic diisocyanates, for example, hexane diisocyanate, trimethylhexane diisocyanate, isophorone diisocyanate, cyclohexane diisocyanate, biscyclohexylmethane diisocyanate, norbornane diisocyanate, diphenylmethane diisocyanate, tetramethylxylylene diisocyanate, tolylene diisocyanate, phenylene diisocyanate, naphthylene diisocyanate, xylylene diisocyanate as well as triisocyanates, such as, trisisocyanatononane.

Further examples of dihydrocarbyl phosphite-blockable polyisocyanates are oligomeric polyisocyanates derived from diisocyanates, for example, from diisocyanates stated in the preceding paragraph, and having number average molecular masses in the range from, for example, 336 to 1000 and isocyanate contents of, for example, 8 to 25 wt. %, in particular, such polyisocyanate oligomers which contain heteroatoms in the residue linking the isocyanate groups. Examples of such substances are corresponding polyisocyanates comprising carbodiimide groups, allophanate groups, uretidione groups, isocyanurate groups, urethane groups and/or biuret groups. Particularly preferred compounds are addition products of 3 mols of diisocyanate and 1 mol of triol, such as, trimethylolpropane or 1:1-adducts formed from a cyclic carbonate and a dialkanol amine.

Further dihydrocarbyl phosphite-blockable polyisocyanates are isocyanate-functional polymers having number average molecular masses of, for example, 800 to 10,000 and isocyanate contents of, for example, 2 to 27 wt. %. Processes for the production of such isocyanate-functional polymers are known to the person skilled in the art. Production may, for example, proceed by free-radical homo- or copolymerization of monoisocyanates with at least one olefinically unsaturated double bond per molecule. Examples of such monoisocyanates are free-radically homo- or copolymerizable monoisocyanates, such as, dimethyl-m-isopropenylbenzyl isocyanate or isocyanatoalkyl (meth) acrylates, such as, isocyanatoethyl (meth)acrylate.

Isocyanate-functional polymers may in particular also be produced by reacting simple polyisocyanates, for example, above-stated simple diisocyanates or oligomeric polyisocyanates, in particular diisocyanates, with sub-stoichiometric quantities of organic compounds with at least two groups capable of reacting with isocyanate groups. Compounds of this kind that are preferably used are compounds comprising at least two primary and/or secondary amino groups and/or hydroxyl groups. Examples are low molecular weight polyols, polyamines and/or amino alcohols, such as, ethylene glycol, hexanediol, neopentyl glycol, butylethylpropanediol, cyclohexanedimethanol, trimethylolpropane, pentaerythritol, ethylenediamine, diethylenetriamine, ethanolamine, methylethanolamine, as well as oligomeric or polymeric compounds having a number average molecular mass of 300 to 5,000. Examples of the latter are polymeric polyols, for example, polyester polyols, polyethers polyols and/or hydroxy-functional acrylic resins known per se in polyurethane chemistry.

Dihydrocarbyl phosphite is used to block the polyisocyanates. The dihydrocarbyl phosphites are diorgano esters of phosphorous acid in the form of diaryl phosphites with identical or different aryl residues, diaralkyl phosphites with identical or different aralkyl residues, dialkyl phosphites with identical or different alkyl residues, arylaralkyl phosphites, arylalkyl phosphites or alkylaralkyl phosphites. Dialkyl phosphites, especially dimethyl phosphite and diethyl phosphite are preferred.

For blocking by means of dihydrocarbyl phosphite, the isocyanate-functional component, in particular the polyisocyanate, may be added to the dihydrocarbyl phosphite or vice versa. Sufficient cooling to moderate the heat arising due to the exothermic nature of the blocking reaction must be ensured; the reaction temperature should preferably not exceed 55° C.

The isocyanate groups of the polyisocyanates are blocked completely and preferably exclusively with one or more dihydrocarbyl phosphites, preferably a single one thereof. If desired, however, up to 80%, preferably no more than 50%, of the isocyanate groups to be blocked may be blocked with at least one other monofunctional blocking agent. Other blocking agents that may be considered alone or in combination are monofunctional compounds known for blocking isocyanates, such as, the CH-acidic, NH—, SH— or OH-functional compounds known for this purpose. Examples are CH-acidic compounds, such as, acetylacetone, acetoacetic acid alkyl esters, malonic acid dialkyl esters; aliphatic or cycloaliphatic alcohols, such as, n-butanol, 2-ethylhexanol, cyclohexanol; glycol ethers, such as, ethylene glycol monobutylether; phenols; oximes, such as, methyl ethyl ketoxime, acetone oxime, cyclohexanone oxime; lactams, such as, caprolactam; azole blocking agents of the imidazole, pyrazole, triazole or tetrazole type.

In co-blocking, 20 to below 100% of the isocyanate groups to be blocked are reacted by means of dihydrocarbyl phosphite and above 0 to 80% of the isocyanate groups to be blocked are reacted with at least one monofunctional blocking agent other than dihydrocarbyl phosphite.

The reaction may proceed in accordance with the conventional processing principles known for the production of co-blocked polyisocyanate components, as a single stage process, in which all the blocking agents are simultaneously reacted with the polyisocyanate, or as a multistage process, for example, by initially performing partial blocking with dihydrocarbyl phosphite and then reacting any remaining free isocyanate groups with at least one further blocking agent or the co-blocking may be performed in the reverse order.

Alternatively, the polyisocyanates blocked with at least one dihydrocarbyl phosphite may be produced by (partially) blocking simple isocyanate components with dihydrocarbyl phosphite and optionally, at least one further blocking agent and then reacting them to yield blocked oligomeric or polymeric polyisocyanate components.

For example, a monoisocyanate comprising at least one olefinically unsaturated double bond may be blocked exclusively with dihydrocarbyl phosphite or optionally, a proportion of such a monoisocyanate may be blocked with dihydrocarbyl phosphite and the remainder with at least one further monofunctional blocking agent, and then be free-radically homopolymerized or copolymerized together with appropriate olefinically unsaturated comonomers.

A polyisocyanate may, for example, also initially be partially blocked with at least one dihydrocarbyl phosphite and optionally, at least one further blocking agent, in particular a diisocyanate may be half-blocked with at least one dihydrocarbyl phosphite and optionally, at least one further blocking agent and then used as a synthesis building block for synthesizing oligomeric or polymeric blocked polyisocyanates. The synthesis methods used for this purpose are those known to the person skilled in the art, either those which give rise to molecular synthesis with direct involvement of remaining unblocked isocyanate groups or those wherein remaining unblocked isocyanate groups are initially reacted with a compound which comprises, in addition to at least one group comprising active hydrogen, at least one further functional group. The latter may subsequently be used to synthesize oligomeric or polymeric blocked polyisocyanates. The reaction of remaining unblocked isocyanate groups with hydroxyalkyl (meth)acrylate may be mentioned merely by way of example, wherein blocked polyisocyanates are obtained, the olefinically unsaturated double bonds of which may be used to synthesize oligomeric or polymeric products, for example, by means of free-radical polymerization.

It goes without saying that all the reactions required for the production of the blocked polyisocyanates which involve free isocyanate groups proceed of course in the absence of water and solvents comprising active hydrogen. Such reactions are accordingly performed without solvent, for example, in a melt, or in solvents which contain no active hydrogen. Examples of suitable solvents are N-methylpyrrolidone; dimethylformamide; ketones, such as, acetone, methyl ethyl ketone, cyclohexanone; esters, such as, butyl acetate and ethyl acetate. Once blocking is complete, solvents containing active hydrogen may also be added and/or inert solvent may be removed, for example, by (vacuum) distillation at sufficiently low temperatures, which do not permit any elimination of the dihydrocarbyl phosphite and optionally, any further blocking agents from the blocked polyisocyanate.

In addition to the resin solids content, the coating compositions may contain conventional coating constituents, such as, for example, pigments, extenders and/or additives. If the coating compositions are not liquid 100%-systems or powder coatings, the coating compositions may contain organic solvent and/or water.

Depending on the nature thereof, the coating compositions may be used for the production of a single-layer coating or of one or more coating layers within a multilayer coating structure, for example, a filler, a pigmented top coat or a clear coat layer, in particular however, a primer coat. Application may be performed by means of conventional application methods such as, for example, spraying, dipping or knife coating onto the widest possible range of substrates. Thermal curing proceeds, in particular, by baking at object temperatures of 150 to 250° C., preferably of 160 to 180° C. For coating with the coating compositions according to the invention, substrates of all materials are suitable, which withstand the temperatures arising during subsequent thermal curing. Metal substrates are particularly suitable.

In thermal curing, the isocyanate groups blocked by means of dihydrocarbyl phosphite are released with elimination of the dihydrocarbyl phosphite and they may crosslink by addition with the isocyanate-reactive groups of the binder.

The coating compositions according to the invention are preferably electrodeposition (ED) coating compositions, which are applied in conventional manner by electrodeposition and then thermally cured, for example, baked. These are aqueous coating compositions with a solids content of, for example, 10 to 30 wt. %. The solids content consists of the resin solids content, which comprises at least one electrodepositable binder (ED binder) with isocyanate-reactive groups and at least one polyisocyanate crosslinking agent blocked by means of at least one dihydrocarbyl phosphite and/or at least one self-crosslinkable ED binder with isocyanate-reactive groups and with isocyanate groups blocked by means of at least one dihydrocarbyl phosphite, and optionally, of extenders, pigments and non-volatile conventional coating additives. Water and optionally organic solvents and optionally volatile additives form the volatile constituents.

The ED coating compositions may contain color-imparting and/or special effect-imparting pigments and/or extenders in a ratio by weight of pigment plus extender to resin solids content of, for example, 0:1 to 0.8:1.

Examples of pigments and extenders which may be used in the ED coating compositions are conventional inorganic and/or organic colored pigments and/or special effect pigments, such as, for example, titanium dioxide, iron oxide pigments, carbon black, phthalocyanine pigments, quinacridone pigments, metal pigments, interference pigments, kaolin, talcum or silicon dioxide.

The ED coating compositions may contain conventional additives, for example, in proportions of in each case 0.1 to 10 wt. %, preferably 0.5 to 7 wt. %, relative to resin solids content. Examples of additives are organic solvents, wetting agents, neutralizing agents, levelling agents, catalysts, antifoaming agents, light stabilizers, antioxidants, colorants, biocides and anticratering additives.

The ED coating compositions may be conventional anodic ED (AED) coating compositions or cathodic ED (CED) coating compositions.

AED coating compositions contain binders conventional for AED coatings, for example, based on polyesters, epoxy resin esters, (meth)acrylic copolymer resins, maleate oils or polybutadiene oils with a weight average molecular mass (Mw) of, for example, 300 to 10000 and an acid value from 35 to 300 mg KOH/g. In addition to the isocyanate-reactive groups, in particular hydroxyl groups, the AED binders bear acidic groups such as, in particular, COOH groups and may be converted into the aqueous phase after neutralization of at least some of the acidic groups with bases, in particular amines.

The ED coating compositions are preferably CED coating compositions based on cathodically electrodepositable binders (CED binders) with isocyanate-reactive groups. CED binders carry cationic groups or groups able to be converted into cationic groups, e.g. alkaline groups, e.g. amino groups, ammonium groups, for example, quaternary ammonium, phosphonium and/or sulphonium groups. Preferred are alkaline groups, in particular preferred are nitrogen-containing alkaline groups, such as amino groups. These groups may be present in quaternized form, or they are converted into cationic groups with a conventional neutralizing agent, for example, lactic acid, formic acid, acetic acid or methanesulfonic acid. The groups able to be converted into cationic groups may be present in completely or partially neutralized form. The CED binders are preferably resins containing tertiary amino groups and optionally, primary and/or secondary amino groups, the total amine value of which is 20 to 150, preferably, 50 to 100 mg KOH/g. The weight average molecular mass (Mw) of these binders is preferably about 300 to 10000. Examples of isocyanate-reactive groups of the CED binders are primary amino groups, secondary amino groups and in particular hydroxyl groups. The CED binders may comprise one, two or all three types of these isocyanate-reactive groups; in general, they contain hydroxyl groups. The proportion of the groups comprising active hydrogen in the CED binders corresponds to an active hydrogen value of 50 to 300 mg KOH/g, for example, corresponding to a sum of primary amine value, secondary amine value and hydroxyl value; the hydroxyl value itself being, for example, in the range of 50 to 250 mg KOH/g.

Examples of CED binders are the conventional ones known to the skilled person, such as amino(meth)acrylic resins, aminopolyurethane resins, amino group-containing polybutadiene resins or modified epoxy resin-carbon dioxide-amine reaction products, and in particular aminoepoxy resins, especially, aminoepoxy resins with primary OH groups.

Both the AED and the CED coating compositions may be supplied to the user as single- or multicomponent materials and be used by said user for the preparation of ED coating baths or for making up the solids content of ED coating baths which are in operation.

The single-component materials are aqueous concentrates, which contain at least one ED binder with isocyanate-reactive groups and at least one polyisocyanate blocked by means of at least one dihydrocarbyl phosphite as crosslinking agent and/or at least one self-crosslinkable ED binder with isocyanate-reactive groups and with isocyanate groups blocked by means of at least one dihydrocarbyl phosphite and, in general, pigments.

Two-component materials, on the other hand, are generally a) an aqueous dispersion of at least one ED binder with isocyanate-reactive groups and at least one polyisocyanate crosslinking agent blocked by means of at least one dihydrocarbyl phosphite and/or of at least one self-crosslinkable ED binder with isocyanate-reactive groups and with isocyanate groups blocked by means of at least one dihydrocarbyl phosphite and b) a separate aqueous pigment paste.

Also possible, for example, is the formulation as a multicomponent system consisting of aqueous ED binder dispersion and non-aqueous preparation of the polyisocyanate crosslinking agent blocked by means of dihydrocarbyl phosphite, wherein each of the two components may be pigmented or wherein a separate pigment paste may be added as a further component.

ED coating layers may be deposited from the ED coating compositions in a conventional manner known to the person skilled in the art on electrically conductive substrates, in particular metal substrates, such as automotive bodies or body parts and then cured thermally, in particular by baking at object temperatures of 150 to 250° C., preferably of 160 to 180° C.

Obviously, the blocking agent dihydrocarbyl phosphite has a favorable effect with regard to corrosion protection; dihydrocarbyl phosphite eliminated during baking may possibly remain in the coating film where it exerts a passivation or corrosion protection action. It is assumed that a similar action may also be achieved with coating compositions which, instead of the dihydrocarbyl phosphite-blocked polyisocyanate crosslinking agents, contain corresponding polyisocyanate crosslinking agents blocked with dihydrocarbyl phosphate.

The present invention is further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions. As a result, the present invention is not limited by the illustrative examples set forth herein below, but rather is defined by the claims contained herein below.

EXAMPLES

Example 1

Production of Bismuth Lactate 901 g of lactic acid (70 wt % in water) were initially introduced and heated to 70° C. 466 g of bismuth oxide ($Bi_2O_3$) was added in portions while the mixture was stirred. After an additional 6 hours of stirring at 70° C., the batch was cooled to 20° C. and left to stand unstirred for 12 hours. Finally, the precipitate was filtered out, washed with a little water and ethanol and dried at a temperature of 40 to 60° C.

Example 2

Production of a CED Binder

A mixture of 666 g methoxypropanol, 319 g bisphenol A, 591 g of an adduct of 2 mol epoxy resin (based on bisphenol A/epichlorhydrine; epoxy equivalent weight 190) and 1 mol polypropylene glycol 400 and 886 g epoxy resin (based on bisphenol A/epichlorhydrine; epoxy equivalent weight 190) was heated to 45° C. and stirred for 1 hour. 121 g diethanolamine and 81.5 g dimethyl aminopropylamine were then added and the batch was stirred for 2 hours at 125° C. The methoxypropanol was then distilled off under vacuum and the batch was diluted with 240 g hexyl glycol to yield a solution of an aminoepoxy resin.

Examples 3 a–e

Production of Blocked Polyisocyanates

The substances stated in Table 1 were reacted according to the following general procedure:

2.75 mol of diisocyanate and 233 g of methyl isobutyl ketone were weighed out into a reaction vessel and stirred at room temperature. Then 2.75 mol of monofunctional blocking agent were added in one hour with cooling. Once a constant NCO value had been reached, 1 mol of the 1:1 adduct obtained from propylene carbonate and diethanolamine and 4.1 g of dibutyltin dilaurate (catalyst) were added. The reaction mixture was kept at 50° C. until no free isocyanate could any longer be detected.

TABLE 1

| Example | Diisocyanate | Blocking agent |
|---|---|---|
| 3a | Diphenylmethane diisocyanate | Diethyl phosphite |
| 3b | Diphenylmethane diisocyanate | Dimethyl phosphite |
| 3c | Tolylene diisocyanate | Diethyl phosphite |
| 3d | Diphenylmethane diisocyanate | Diethylene glycol monobutyl ether |
| 3e | Diphenylmethane diisocyanate | Butanone oxime |

Examples 4a–e

Production of CED Clear Coats

In each case, the aminoepoxy resin solution from Example 2 was mixed with the respective solution of blocked polyisocyanate from Examples 3 a–e in a solids weight ratio of 70:30. Bismuth lactate (from Example 1) was added as catalyst corresponding to a content of 1.3 wt. % bismuth, relative to resin solids, and dilution was performed with formic acid and deionized water to yield a 12 wt. % CED clear coat with an acid content of 33 milliequivalents per 100 g of resin solids.

Unphosphated steel sheets were coated with these CED clear coats in conventional manner by cathodic electrodeposition to a dry film thickness of 20 μm and baked for 20 minutes at 180° C. (object temperature).

The baked CED coating layers were evaluated with regard to their corrosion protection action. To this end under-film rust creepage (in mm on one side) at a cut was determined after 480 hours of salt spray testing (to DIN 50 021-SS in conjunction with DIN 53 167).

Perforated (perforation diameter 10 mm), unphosphated metal test sheets were also coated in an entirely similar manner and then exposed to salt spray conditions to DIN 50 021-SS for 480 hours. The edges of the perforations were evaluated for edge rusting (ratings KW 0 to 5; KW 0=no rust on edges; KW 1=isolated rust spots on edges; KW 2=rust spots on less than ⅓ of edges; KW 3=⅓ to ⅔ of edges covered with rust; KW 4=more than ⅔ of edges covered with rust; KW 5=edges completely rusty).

The corrosion protection results achieved with the CED coatings 4a–e are compiled in Table 2.

TABLE 2

| CED clear coat under test | Corrosion protection; creepage at a cut in mm (one side) | Edge rusting, rating |
|---|---|---|
| 4a, according to the invention | 1–2 | 2 |
| 4b, according to the invention | 3 | 3 |
| 4c, according to the invention | 2–3 | 3 |
| 4d, Comparison | 4 | 4 |
| 4e, Comparison | 4-5 | 5 |

As can be seen from the results compiled in table 2, the corrosion protection action of the CED clear coats 4a–c (4a and 4c, blocking agent diethyl phoshite; 4b, blocking agent dimethyl phoshite) is stronger than that of the comparative CED clear coats 4d (blocking agent diethylene glycol monobutyl ether) and 4e (blocking agent butanone oxime).

What is claimed is:

1. Thermally curable electrodeposition coating composition for application onto an electrically conductive substrate, said electrodeposition coating composition having a resin solids content comprising (a) at least one binder with isocyanate-reactive groups and at least one polyisocyanate crosslinking agent blocked with at least one dihydrocarbyl phosphite and/or (b) at least one self-crosslinkable binder with isocyanate-reactive groups and with isocyanate groups blocked with at least one dihydrocarbyl phosphite.

2. The electrodeposition coating composition of claim 1, wherein 20 to below 100% of the blocked isocyanate groups are blocked with the at least one dihydrocarbyl phosphite and above 0 to 80% of the blocked isocyanate groups are blocked with at least one other monofunctional blocking agent.

3. The electrodeposition coating composition of claim 1, wherein the at least one dihydrocarbyl phosphite is dialkyl phosphite.

4. The electrodeposition coating composition of claim 1, wherein the at least one dihydrocarbyl phosphite is selected from dimethyl phosphite and diethyl phosphite.

5. The electrodeposition coating composition of claim 1, wherein the isocyanate-reactive groups are selected from the group consisting of hydroxyl groups, primary amino groups, secondary amino groups and combinations thereof.

6. A process for the production of a coating layer on an electrically conductive substrate which comprises electrodepositing the electrodeposition coating composition of claim 1 and thermal curing of the electrodeposited coating layer.

7. The process of claim 6, wherein the coating layer is selected from the group consisting of a single-layer coating and a coating layer forming a coating layer within a multi-layer coating structure.

8. A substrate coated with the composition of claim 1.

* * * * *